UNITED STATES PATENT OFFICE.

WILLIAM DOUGLAS, OF DETROIT, MICHIGAN.

PROCESS OF RETTING VEGETABLE STALKS.

1,224,722.  Specification of Letters Patent.  Patented May 1, 1917.

No Drawing.  Application filed June 19, 1916. Serial No. 104,405.

*To all whom it may concern:*

Be it known that I, WILLIAM DOUGLAS, a subject of the King of Great Britain and Ireland, residing at Detroit, county of Wayne, State of Michigan, have invented a certain new and useful Improvement in the Process of Retting Vegetable Stalks, and declare the following to be a full, clear, and exact description of the same, such as will enable others skilled in the art to which it pertains to make and use the same.

This invention relates to a process of retting or cleaning of vegetable fibers, such as flax, hemp, ramie, rhea, china grass, etc., and has for its object an improved method of treating the same, by which the adhesion between the fiber and the woody core or other non-fibrous element, is broken up, while at the same time the fiber is subjected to a treatment which results in strengthening it and improving its quality.

Hitherto, retting or disintegration of such vegetable fibers has been effected largely by immersion in water or by exposure to dew and sunlight. By this or some other means the valuable fiber must be released from the non-fibrous matter through the disintegration or fermentation of the tenacious gum known as pectose. It is, however, generally desirable that some of the pectose be left in association with the fiber.

My invention involves the use of solvents to effect the release of the pectose from its association with the fiber and non-fibrous elements of the plant. Any one of several solvents now in general use for gums, waxes, resins, and oils may be used, such, for example, as petroleum, petroleum spirit, naphtha, benzin, carbon, tetrachlorid, ethyl trichlorid, tetrachlorid of ethane, etc. These may be used with water at any ordinary temperature, or in the form of steam, dependent on the specific gravity of the solvent chosen. The water may be applied contemporaneously with the solvent, or in some cases actually commingled therewith, or later and alone, after the solvent has first attacked and loosened the pectose from the other plant elements. If water is applied commingled with the solvent, the emulsion must then be allowed to stand until the solvent and the water have separated themselves from one another. If the solvent is of lighter specific gravity, it rises, with its decomposed pectose, to a level above or on top of the water. If, however, the solvent is heavier than water, it falls to the bottom of the vat or container, while the aqueous liquid and the decomposed pectose rise partly to a higher level than the water and partly in solution with the water. In case the water used is vaporized into steam, it should be introduced from beneath the mass of stalks and allowed to rise therethrough and through the then immersing solvent. It is generally advisable to support the mass of plant matter, at whatever level may be chosen, in holders or platforms of suitable form.

Whichever specific gravity of solvent is employed, it breaks up the pectose into lighter-than water and heavier-than water elements. The lighter-than-water portion, if left in association with the fiber elements, is beneficial thereto, and should be allowed to remain to some extent in the loosened fibers, to impart thereto the desired tensile strength and quality. The duration of the solvent's application to the plants must be left to the judgment of the operator, since what would be too long in the case of one of variety of plant or in the case of one solvent would not be nearly enough for another. The solvent being allowed to purify itself in the water by the action of specific gravity, may be used repeatedly without appreciable loss and without the necessity of distillation to remove impurities from it.

In the treatment of large quantities of vegetable fibers, in place of soaking the mass in a solvent and then washing with water, leaving the mass of stalks stationary in a vat, the plants may be placed in suitable holders, mounted on an endless belt or similar conveyer, and alternately drawn through vats of the solvent and of water, or of the solvent and water mingled, as suggested above, the desired duration of the immersions determining the rate of travel imparted to the carrying belt or conveyer.

This process, while directed primarily to the treatment of vegetable matter is also adapted for the treatment of wool, and offers the same advantages as to possible economy as regards avoidance of re-distillation of the solvent.

What I claim is:

1. The process of retting fibrous vegetable matter, consisting in subjecting the same to the contemporaneous action of a non-combining solvent and water at ordinary pressure and temperature, to effect the dissolution of the pectose sufficiently for the removal of the starchy element thereof by the action of specific gravity.

2. The process of retting vegetable matter, consisting in effecting a partial dissolution of the pectose therefrom by the action of a solvent, and its contemporaneous removal from further association therewith by the admixture of an aqueous element of varient specific gravity from that portion of the pectose whose removal is desired.

3. The process of retting fibrous vegetable matter, consisting in subjecting the same to the action of a solvent capable of releasing the undesired portion of the pectose from its association with the fibrous portion and to the action of an aqueous element of variant specific gravity from said solvent and the pectose released thereby.

4. The process of retting fibrous vegetable matter consisting in subjecting the same to the action of a non-combining solvent, and in effecting the disassociation of the released pectose and its solvent from the fibers through the medium of an aqueous bath.

5. The process of retting vegetable matter, consisting in subjecting the same to the action of a solvent capable of effecting the partial release of the pectose primarily associated with the fibrous portion, and in removing the released pectose and its solvent through the medium of an immersing element of variant specific gravity.

In testimony whereof, I sign this specification in the presence of two witnesses.

WILLIAM DOUGLAS.

Witnesses:
HARRY L. WAGNER,
WILLIAM M. SWAN.